United States Patent
Knapp

(10) Patent No.: US 9,885,433 B2
(45) Date of Patent: Feb. 6, 2018

(54) VIBRATION-RESISTANT BOLTLESS ESP COMPONENT CONNECTION

(71) Applicant: Baker Hughes Incorporated, Houston, TX (US)

(72) Inventor: John M. Knapp, Claremore, OK (US)

(73) Assignee: BAKER HUGHES

(*) Notice: Subject to any disclaimer, the term of this patent is extended or adjusted under 35 U.S.C. 154(b) by 694 days.

(21) Appl. No.: 14/475,871

(22) Filed: Sep. 3, 2014

(65) Prior Publication Data

US 2015/0130185 A1    May 14, 2015

Related U.S. Application Data

(60) Provisional application No. 61/873,666, filed on Sep. 4, 2013.

(51) Int. Cl.

| | | |
|---|---|---|
| *F16L 19/02* | (2006.01) | |
| *F16L 25/00* | (2006.01) | |
| *F16L 37/12* | (2006.01) | |
| *E21B 43/12* | (2006.01) | |
| *E21B 17/06* | (2006.01) | |
| *F04B 47/06* | (2006.01) | |

(52) U.S. Cl.
CPC .......... *F16L 19/0231* (2013.01); *E21B 17/06* (2013.01); *E21B 43/128* (2013.01); *F04B 47/06* (2013.01); *F16L 25/009* (2013.01); *F16L 37/1215* (2013.01)

(58) Field of Classification Search
CPC ............... F16L 19/0231; F16L 37/1215; F16L 37/0847; F16L 37/098; F16L 37/0985
USPC .......................................................... 285/322
See application file for complete search history.

(56) References Cited

U.S. PATENT DOCUMENTS

| | | | | |
|---|---|---|---|---|
| 2,784,987 A | * | 3/1957 | Corcoran | F16B 7/0413 285/322 |
| 5,058,930 A | * | 10/1991 | Schlosser | F16L 19/005 285/319 |
| 5,362,110 A | * | 11/1994 | Bynum | F16L 19/005 411/326 |
| 6,478,343 B2 | * | 11/2002 | King Lee | F16L 19/005 285/322 |
| 6,557,905 B2 | | 5/2003 | Mack et al. | |
| 6,905,142 B2 | * | 6/2005 | Do | F16L 19/005 285/322 |
| 2011/0240370 A1 | * | 10/2011 | Shwets | E21B 4/02 175/92 |
| 2015/0102598 A1 | * | 4/2015 | Guest | F16L 37/0925 285/322 |

FOREIGN PATENT DOCUMENTS

CA     2865679 A1 *  9/2013  .......... F16L 19/0231

* cited by examiner

*Primary Examiner* — David E Bochna
(74) *Attorney, Agent, or Firm* — Shawn Hunter

(57) ABSTRACT

Devices and methods for reversibly securing first and second component subs of submersible well pump assembly. First and second component subs are provided with connection end portions which are placed into a sealed abutting relation. A connecting collar is threaded onto the first component sub. A locking groove on the first component sub receives a locking dog therein.

15 Claims, 4 Drawing Sheets

VIBRATION-RESISTANT BOLTLESS ESP COMPONENT CONNECTION

BACKGROUND OF THE INVENTION

1. Field of the Invention

The present invention generally relates to component connections. In particular aspects, the invention relates to component connections that are useful to interconnect components of an electrical submersible pump of the type used in wellbores and the like.

2. Description of the Related Art

Electrical submersible pumps ("ESP"s) are commonly used for production of hydrocarbon fluids from oil and gas wells. A typical ESP includes a number of modular subassemblies that are housed within separate subs, or sections, that are secured to one another to function as a unit. An exemplary ESP, for example, would include a motor section, pump section, seal section and might also include a gas separator section. In order to interconnect these sections, individual subs are traditionally provided with flanged end portions. A multiplicity of threaded screws are passed through holes in the flange of one sub into threaded holes in a mating sub, thereby securing the subs together. The width of the flange must be sufficient to accommodate the connecting bolts and, as a result, the interior diameter of the flow passage within the two components being interconnected must be undesirably decreased.

U.S. Pat. No. 6,557,905 issued to Mack et al. describes techniques for interconnecting ESP components without the use of nuts and bolts commonly found in such connections. The '905 patent is owned by the assignee of the present application and is herein incorporated by reference. Use of this method provides less of an interior restriction than techniques that use bolts. It is also stronger and uses fewer separate components. Over time, however, the tightness of the connection may become undesirably reduced.

SUMMARY OF THE INVENTION

The present invention provides systems and methods for reversibly interconnecting two individual components. In particular embodiments, the invention provides systems and methods for reversibly interconnecting separate subs, or sections, of an ESP. The described component connections do not require bolts and are resistant to loosening that might result from vibration of the connection. In addition, component connections in accordance with the present invention can be used without the need to significantly restrict the interior openings of the components being connected as is the case of prior techniques, such as that described in the '905 patent discussed above.

Exemplary connections are described which include a first tubular component that is reversibly affixed to a second tubular component. The first tubular component includes a pin-type threaded connection. The second tubular component preferably includes an annular notch. Preferably also, a retaining ring is disposed within the annular notch. An annular locking groove is formed within at least one of the tubular components.

A connection collar is used to reversibly affix the first and second components together. Exemplary connection collars are described that include an annular portion and an angularly segmented portion. The connection collar includes an internally threaded portion that is shaped and sized to threadedly engage the pin-type threaded connection of the first tubular component. One axial end of the connection collar has a plurality of axial slots formed therein to form separate fingers that can be deflected outwardly. A dog is formed on the distal end of the fingers and is shaped and sized to reside within the annular locking groove.

BRIEF DESCRIPTION OF THE DRAWINGS

The advantages and other aspects of the invention will be readily appreciated by those of skill in the art and better understood with further reference to the accompanying drawings in which like reference characters designate like or similar elements throughout the several figures of the drawings and wherein.

DETAILED DESCRIPTION OF THE PREFERRED EMBODIMENTS

Figure 1:
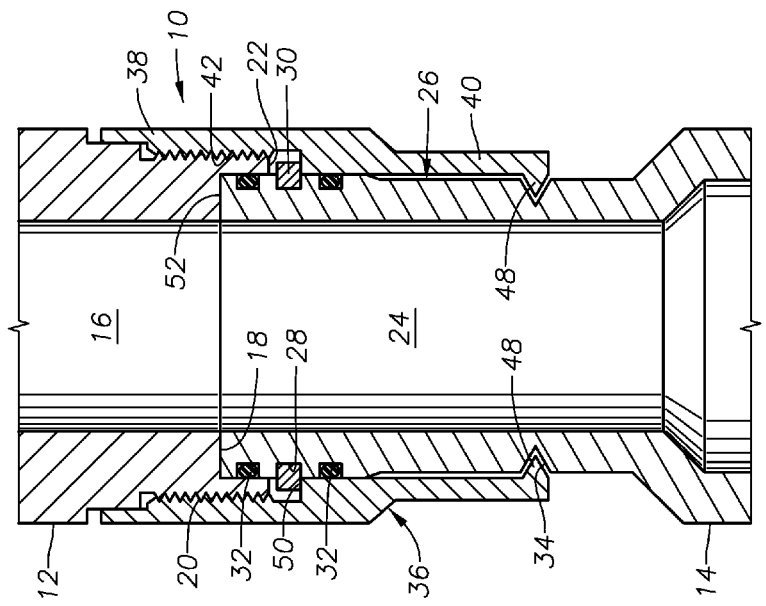
FIG. 1 is a side, cross-sectional view of an exemplary component connection in accordance with the present invention wherein two tubular components are unconnected to one another.
Figure 2:
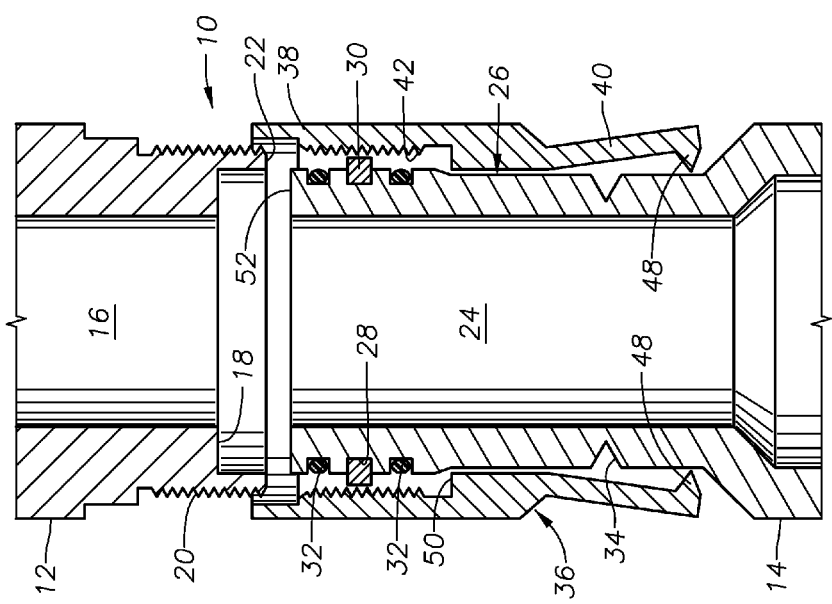
FIG. 2 is a side, cross-sectional view of the component connection shown in FIG. 1, now with both tubular components connected.

FIGS. 1 and 2 depict an exemplary component connection 10 which includes a first tubular component 12 and a second tubular component 14 that are being interconnected in an end-to-end fashion. A central axial flowbore 16 is defined within the first tubular component 12. It is noted that the first tubular component 12 includes an axial end face 18 and a pin-type threaded portion 20 that is proximate the end face 18. An annular lip 22 preferably projects outwardly from the end face 18.

The second tubular component 14 includes a central axial flowbore 24 along its length and presents a connecting axial end portion, generally indicated at 26. The axial end portion 26 includes an external annular notch 28 within which is seated a retaining ring 30. In certain embodiments, the retaining ring 30 can be a C-ring that is snapped into the notch 28. Preferably, the end portion 26 also carries O-ring fluid seals 32, of a type known in the art. An external annular groove 34 is formed within the end portion 26.

Figure 3:
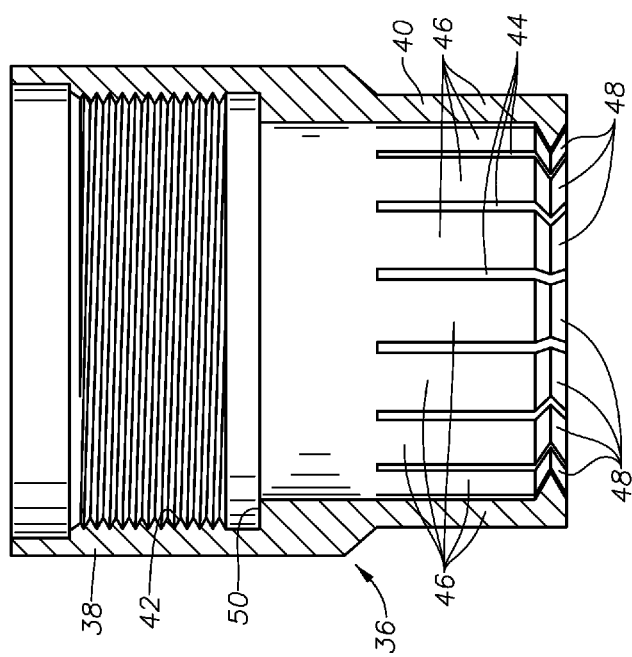
FIG. 3 is a side, cross-sectional view of an exemplary connection collar used with the component connection shown in FIGS. 1 and 2.

A connection collar 36 surrounds the end portion 26. Portions of the connection collar 36 are better appreciated with reference to FIG. 3. The exemplary connection collar 36 includes an annular portion 38 and an angularly segmented portion 40. The annular portion 38 includes interior threads 42 that are shaped and sized to be complementary to the threads 20 of the first tubular component 12. The segmented portion 40 includes axial slots 44 formed within which separate the end of the segmented portion 40 into fingers 46. A dog 48 projects radially inwardly from the axial end of each finger 46. A stop shoulder 50 is defined within the connection collar 36.

FIG. 1 depicts the connection 10 in an unconnected configuration while FIG. 2 shows the first and second tubular components 12, 14 connected by the connecting collar 36. In the unconnected configuration, the fingers 46 of the connecting collar 36 are spread apart as the dogs 48 are located out of the locking groove 34. To assemble the connection 10, the end face 18 of the first tubular component 12 is placed into an abutting relation with the end face 52 of the end portion 26 of the second tubular component 14. The lip 22 now radially surrounds the end portion 26 of the second tubular component 14 so that a fluid tight seal is provided to isolate the flowbores 16, 24 by O-ring seals 32. The connection collar 36 is threaded onto the pin-type threading of the first tubular component 12. As the collar 36 is tightened, the dogs 48 of the fingers 46 will be drawn upwardly and snap into the annular locking groove 34. The stop shoulder 50 of the connection collar 36 will be brought into contact with the retaining ring 30 to ensure that the first and second tubular components 12, 14 are drawn together. The presence of the dogs 48 within the annular locking groove 34 will prevent loosening of the connection 10 as a result of vibration or other forces. Thus, the component connection 10 is vibration-resistant.

The connection 10 is reversible. The dogs 48 and the locking groove 34 preferably have tapered sides, so that the dogs 48 and groove 34 have a generally triangular or V-shaped cross-section. In order to disconnect the first and second tubular components 12/14 from one another, unscrewing torque force is supplied to the collar 36 to cause the dogs 48 to ramp up out of the groove 34 and permit the disengagement of the collar 36 from the upper tubular component 12. Then, the connecting collar 36 can be rotated to unthread and thereby release the first and second tubular components 12, 14 from one another. Yet, the spring tension of the fingers 46 hold the dogs 48 into the groove 34 and prevent the loosening of the collar 36 due to vibratory forces and the possible unintended separation of tubular components 12 and 14.

Figure 4:
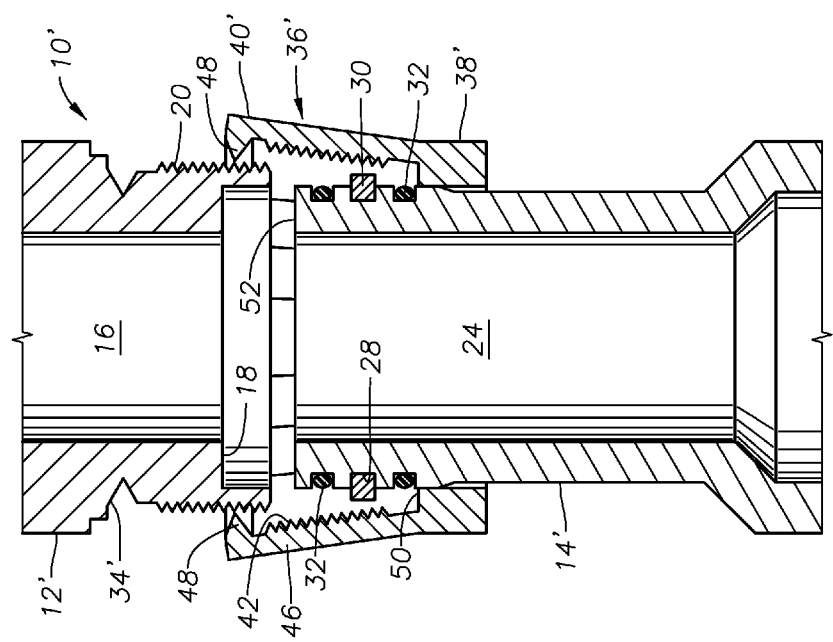
FIG. 4 is a side, cross-sectional view of an alternative exemplary component connection in accordance with the present invention wherein the two tubular components are unconnected to one another.
Figure 5:
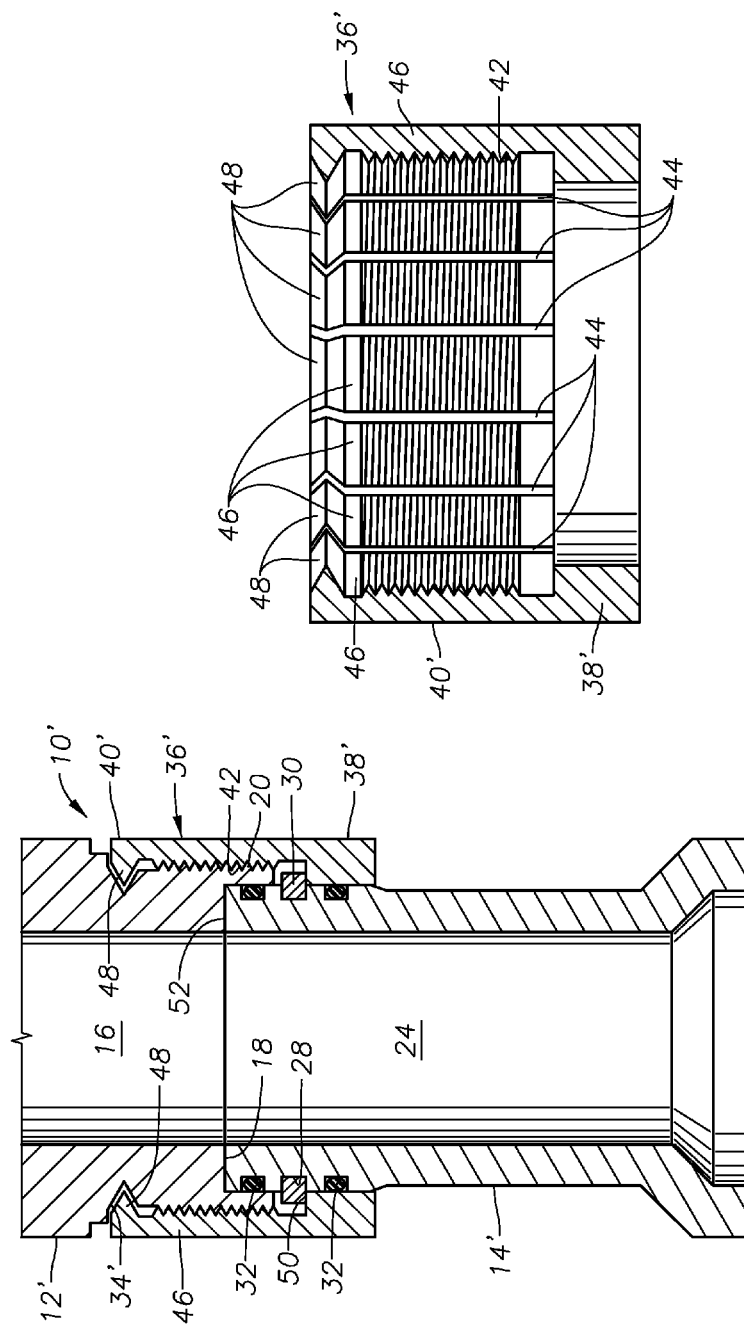
FIG. 5 is a side, cross-sectional view of the component connection shown in FIG. 4, now with both tubular components connected.
Figure 6:
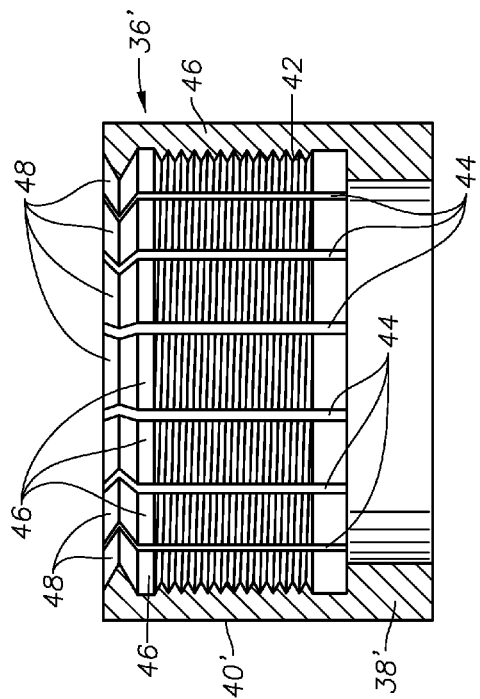
FIG. 6 is a side, cross-sectional view of an exemplary connection collar used with the component connection shown in FIGS. 4 and 5.

FIGS. 4-6 illustrate an exemplary alternative component connection 10' in accordance with the present invention. The alternative component connection 10' is constructed and operates in the same manner as the component connection 10 described previously, except where indicated otherwise. The connection 10' includes a first tubular component 12' and a second tubular component 14'. In this embodiment, the locking groove 34' is formed within the first tubular component 12' rather than the second tubular component 14'.

Features of the connecting collar 36' are depicted in greater detail in FIG. 6. As with the connecting collar 36 described previously, the connecting collar 36' includes an annular portion 38' and an angularly segmented portion 40'. Axial slots 44 in the angularly segmented portion 40' forms fingers 46 that can be deflected radially outwardly. Dogs 48 are formed on the distal portions of the fingers 46 and are shaped and sized to reside within the locking groove 34'.

FIG. 4 illustrates the component connection 10' in an unconnected condition wherein the first and second tubular components 12' and 14' are not connected. FIG. 5 shows the tubular components 12' and 14' in a connected condition. In order to connect the tubular components 12', 14', the end faces 18, 52 of the tubular components 12', 14' are placed in abutting relation, as shown in FIG. 5. The connecting collar 36' is interthreaded with the first tubular component 12 and the dogs 48 of the fingers 46 will flex radially outwardly to pass over threads 20 and then snap into the locking groove 34'. The connection 10' is vibration resistant due to the presence of the dogs 48 within the locking groove 34' which discourages reverse rotation of the connecting collar 36'. As with the previous component connection 10 described previously, the dogs 48' and groove 34' are preferably tapered so that dogs 48' and groove 34' have a generally triangular or V-shaped cross-section.

The connection 10' is reversible. In order to disconnect the first and second tubular components 12', 14', the fingers 46 are deflected radially outwardly so that the dogs 48' are removed from the locking groove 34'. The outward deflection is accomplished by applying torque to the collar 36' to unscrew it. The tapered faces of the locking dogs 48' and the mating groove 34' force the collar fingers 46 to deflect and the dogs 48' to ride out of the groove 34', thus permitting the collar 36' to unscrew and disengage the threads of the mating sub. The springy nature of the collar fingers 46 prevents vibratory forces from causing the collar 36' to loosen or disengage, but permits normal disassembly torque applied to the collar 36' to disengage the collar 36' from the mating sub.

Figure 7:
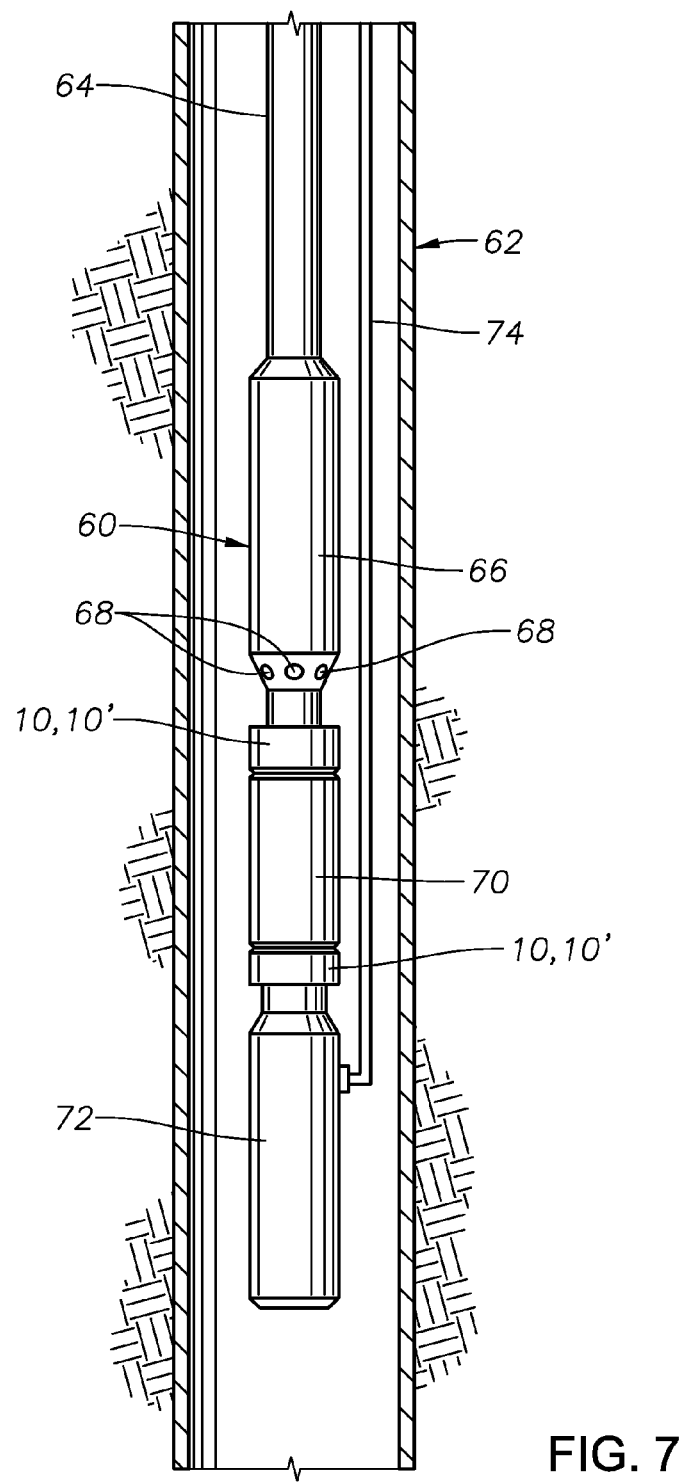
FIG. 7 is a side view of an exemplary ESP which incorporates component connections in accordance with the present invention.

It should be appreciated that the invention also provides a vibration-resistant electric submersible pump (ESP) assembly that includes connection components in accordance with the present invention. FIG. 7 illustrates an exemplary ESP assembly 60 which is suspended within a wellbore 62 by running string 64 and which includes a number of separate subs or components that are secured to one another using component connections 10/10' in accordance with the present invention. The exemplary ESP assembly 60 includes a pump sub 66 with pump inlets 68. The ESP assembly also includes a seal section sub 70. A motor section sub 72 is disposed below the seal section sub 70. Power conduit 74 provides power to the motor section sub 72. Component connections 10 or 10' are being used to interconnect the pump sub 66 with the seal section sub 70 and the seal section sub 70 with the motor section sub 72. It is noted that one could utilize threaded adapters to retrofit component connections 10 or 10' onto threaded components within an ESP assembly, thereby providing vibration-resistance to the ESP assembly. It should be recognized that the invention provides a method for reversibly connecting first and second component subs of a submersible pump assembly.

Those of skill in the art will recognize that numerous modifications and changes may be made to the exemplary designs and embodiments described herein and that the invention is limited only by the claims that follow and any equivalents thereof.

What is claimed is:

1. A submersible well pump assembly comprising:
   a first component sub being either of a pump sub, seal sub or motor sub of an electric submersible pump and having a first connection end portion, the first component sub having an externally-threaded portion;
   a second component sub being either of a pump sub, seal sub or motor sub of an electric submersible pump having a second connection end portion;
   a locking groove formed within one of the first connection end portion or the second connection end portion;
   a connection collar including an interior threaded portion to threadedly engage the externally-threaded portion of the first component sub, the connection collar having an annular portion and an annular segmented portion, the annular segmented portion having a plurality of axial slots that form fingers therebetween; and including an inwardly-projecting dog formed upon the connection collar, the dog residing within the locking groove when the connection collar is threadedly engaged with the first component sub to preclude reverse rotation of the connection collar.

2. The submersible well pump assembly of claim 1 wherein the inwardly-projecting dog is formed upon at least one of the fingers.

3. The submersible well pump assembly of claim 1 further comprising:
a retaining ring radially surrounding the second connection end portion; and
a stop shoulder formed within the connection collar which is brought into contact with the retaining ring when the interior threaded portion of the connection collar threadedly engages the externally-threaded portion of the first component sub.

4. The submersible well pump of claim 3 wherein the retaining ring resides within an annular notch formed within the second connection end portion.

5. The submersible well pump of claim 1 wherein:
axial flowbores are formed within each of the first and second connection portions;
the first connection portion presents an annular end face with a lip that projects axially outwardly therefrom; and
the lip radially surrounding an end portion of the second connection portion, thereby providing a fluid tight seal for the axial flowbores when the second connection portion abuts the end face.

6. The submersible pump of claim 1 wherein the locking groove is formed within the first connection end portion.

7. The submersible pump of claim 1 wherein the locking groove is formed within the second connection end portion.

8. A submersible well pump assembly comprising:
a first component sub being either of a pump sub, seal sub or motor sub of an electric submersible pump and having a first connection end portion, the first component sub having an externally-threaded portion;
a second component sub being either of a pump sub, seal sub or motor sub of an electric submersible pump and having a second connection end portion;
a locking groove formed within one of the first connection end portion or the second connection end portion;
a connection collar including an interior threaded portion to threadedly engage the externally-threaded portion of the first component sub, the connection collar comprising an annular portion and an annular segmented portion, the annular segmented portion having a plurality of axial slots that form fingers therebetween; and
an inwardly-projecting dog formed upon the connection collar, the dog residing within the locking groove when the connection collar is threadedly engaged with the first component sub to preclude reverse rotation of the connection collar.

9. The submersible well pump assembly of claim 8 wherein the dog is formed upon at least one of the fingers.

10. The submersible well pump assembly of claim 8 further comprising:
a retaining ring radially surrounding the second connection end portion; and
a stop shoulder formed within the connection collar which is brought into contact with the retaining ring when the interior threaded portion of the connection collar threadedly engages the externally-threaded portion of the first component sub.

11. The submersible well pump of claim 10 wherein the retaining ring resides within an annular notch formed within the second connection end portion.

12. The submersible well pump of claim 8 wherein:
axial flowbores are formed within each of the first and second connection portions;
the first connection portion presents an annular end face with a lip that projects axially outwardly therefrom; and
the lip radially surrounding an end portion of the second connection portion, thereby providing a fluid tight seal for the axial flowbores when the second connection portion abuts the end face.

13. The submersible pump of claim 8 wherein the locking groove is formed within the first connection end portion.

14. The submersible pump of claim 8 wherein the locking groove is formed within the second connection end portion.

15. A method for reversibly connecting first and second component subs of submersible well pump assembly, the method comprising the steps of:
providing the first component sub with a first connection end portion with an externally-threaded portion, the first component sub being either of a pump sub, seal sub or motor sub of an electric submersible pump and;
providing the second component sub with a second connection end portion, the second component sub being either of a pump sub, seal sub or motor sub of an electric submersible pump and;
disposing the second connection end portion in abutting relation to the first connection end portion;
threading a connecting collar onto the externally-threaded portion, thereby securing the first and second connection end portions together, the connecting collar having an annular segmented portion with a plurality of axial slots that form fingers therebetween;
flexing the fingers to permit a locking dog on the connecting collar to pass over the externally-threaded portion; and
disposing the locking dog within a locking groove formed within either of the first or second connection end portions to preclude reverse rotation of the connection collar.

* * * * *